US012670804B2

(12) United States Patent
Maeder

(10) Patent No.: US 12,670,804 B2
(45) Date of Patent: Jun. 30, 2026

(54) SYSTEM FOR TRAINING IN CBRN RISKS AND THREATS

(71) Applicant: ERTC TECHNOLOGIES, Soultz-Haut-Rhin (FR)

(72) Inventor: Olivier Maeder, Issenheim (FR)

(73) Assignee: ERTC TECHNOLOGIES, Soultz-Haut-Rhim (FR)

( * ) Notice: Subject to any disclaimer, the term of this patent is extended or adjusted under 35 U.S.C. 154(b) by 355 days.

(21) Appl. No.: 18/281,712

(22) PCT Filed: Mar. 11, 2022

(86) PCT No.: PCT/EP2022/056313
§ 371 (c)(1),
(2) Date: Sep. 12, 2023

(87) PCT Pub. No.: WO2022/194696
PCT Pub. Date: Sep. 22, 2022

(65) Prior Publication Data
US 2024/0161649 A1 May 16, 2024

(30) Foreign Application Priority Data
Mar. 14, 2021 (FR) ...................................... 2102511

(51) Int. Cl.
*G09B 9/00* (2006.01)
*G02B 27/01* (2006.01)
(Continued)

(52) U.S. Cl.
CPC ........... *G09B 9/00* (2013.01); *G02B 27/0149* (2013.01); *G06T 19/006* (2013.01); *G02B 27/0093* (2013.01)

(58) Field of Classification Search
CPC .. G09B 9/00; G02B 27/0149; G02B 27/0093; G06T 19/006
See application file for complete search history.

(56) References Cited

U.S. PATENT DOCUMENTS 10,420,965 B1 * 9/2019 Dykes ..................... A62B 18/08
2002/0039085 A1 * 4/2002 Ebersole ................ A62B 9/006
345/8

(Continued)

FOREIGN PATENT DOCUMENTS

| EP | 3100768 A1 | 12/2016 |
| WO | WO03015057 A1 | 2/2003 |
| WO | WO2019164737 A1 | 8/2019 |

OTHER PUBLICATIONS

Jones, David, et al. Measuring Stress i an Augmented Training Environment: Approaches and Applications, Intelligent Robotics and Applications: [Lecture Notes in Computer Science; Lect. Notes Computer], Springer International Publishing, Cham, pp. 23-33, (Jun. 21, 2016), ISSN: 0302-9743, ISBN: 978-3-030-89846-5. XP047556036 the whole document.

(Continued)

*Primary Examiner* — Steve Rowland
(74) *Attorney, Agent, or Firm* — Pehr B. Jansson

(57) ABSTRACT

A training system in chemical, biological, radiological and nuclear CBRN risk using a virtual reality scenario comprises a CBRN-AR augmented virtual reality mask. The mask comprises a virtual reality screen, a graphics processing module comprising a graphics microprocessor for broadcasting images of the virtual reality scenario on the virtual reality screen, a main processing module comprising a main microprocessor, a memory comprising the virtual reality scenario, a biometric sensor measuring a physiological parameter of a user of the CBRN-AR mask during the execution of the virtual reality scenario, and a stress actuator modifying an internal environmental parameter of the CBRN-AR mask during the execution of the virtual reality scenario, the stress actuator comprising a controlled opening
(Continued)

valve which directs air towards the interior of the CBRN-AR mask so as to regulate an incoming air flow.

14 Claims, 11 Drawing Sheets

(51) Int. Cl.
  G06T 19/00 (2011.01)
  G02B 27/00 (2006.01)

(56) References Cited

U.S. PATENT DOCUMENTS

| | | | | |
|---|---|---|---|---|
| 2003/0062046 | A1 | 4/2003 | Weismann et al. | |
| 2004/0130504 | A1* | 7/2004 | Ebersole, Jr. .......... | A62B 18/04 |
| | | | | 345/8 |
| 2005/0121031 | A1* | 6/2005 | Ebersole .............. | G02B 27/017 |
| | | | | 128/201.27 |
| 2005/0168403 | A1* | 8/2005 | Ebersole .............. | G02B 27/017 |
| | | | | 345/8 |
| 2015/0302643 | A1* | 10/2015 | Miller ..................... | G06T 13/40 |
| | | | | 345/633 |
| 2016/0127716 | A1* | 5/2016 | Ramiro ................... | B63C 11/12 |
| | | | | 348/53 |
| 2018/0173308 | A1* | 6/2018 | Smith ..................... | G06F 3/147 |
| 2019/0374148 | A1* | 12/2019 | Cunnington ......... | A61B 5/7445 |
| 2019/0388647 | A1* | 12/2019 | Bender ................... | G06F 3/011 |
| 2021/0343182 | A1* | 11/2021 | Lu ........................... | G09B 19/24 |
| 2024/0073219 | A1* | 2/2024 | Maizels ................ | H04L 63/108 |

OTHER PUBLICATIONS

PCT/EP2022/056313 International Search Report, Jun. 9, 2022, European Patent Office p.b. 5818, Patentlaan 2, 2280 HV Rijswijk, Netherlands.
PCT/EP2022/056313 Written Opinion of the International Searching Authority, Jun. 9, 2022, European Patent Office D-80298 Munich.

* cited by examiner

SYSTEM FOR TRAINING IN CBRN RISKS AND THREATS

TECHNICAL FIELD

The invention relates to a training system in CBRN (Chemical, Biological, Radiological and Nuclear) risks and threats implemented in the form of an CBRN mask using augmented virtual reality (i.e. also known by the English acronym AR for "Augmented Reality") in combination with a virtual reality scenario. A CBRN risk or threat is a chemical, biological, radiological and/or nuclear risk or threat corresponding to a high level of danger to human life, potentially affecting the lives of civilian populations or security and defense personal, such as civil security, firefighters, police or military forces. Education or training allows security and defense personal to understand CBRN risks and threats as part of training before being confronted with them in real conditions. The invention aims to provide an augmented virtual reality training system applying in particular to the professional education and training of said security and defense personal.

BACKGROUND

By way of example for the training of firefighters, the existing pedagogical education and training tools consist either of a fire box, a fire house or a maneuvering tower or disused buildings in which the whole phenomena, that firefighters may encounter during a fire, are reproduced. Thus, firefighters can repeat technical gestures in order to train and improve their operational efficiency in conditions close to reality. Various drawbacks result from such an approach to education and training, in particular: difficulties in finding disused buildings, expensive platform, environmental impact (i.e. by the generation of solid, liquid, gaseous and waste effluents), complex technical implementation, worker safety. Similar issues exist for education and training for other security and defense personal in their specific contexts. In conclusion, current training is complicated because it is dangerous in some cases, the types of risky interventions cannot be controlled, therefore less practiced in training and also costly in equipment specially designed for education purposes.

Therefore, there is a need to offer an educational and training technique that is easier to implement, for example by reducing or even avoiding the aforementioned drawbacks. Document US 2005/168403 A1 describes a wireless augmented reality system and method, in which the user wears part or all of the equipment necessary to perform a simulation. Various layouts are presented which can be selected depending on the needs of the system, such as the number of users and the type of tracking equipment. The system and method are used for training firefighters.

Document XP 047556036 (David Jones et al., «Measuring Stress in an Augmented Training Environment: Approaches and Applications», 21 Jun. 2016, INTELLIGENT ROBOTICS AND APPLICATIONS pages. 23-33, Springer International Publishing Switzerland 2016) describes a training system enabling adapting the level of stress to optimize training in virtual reality.

SUMMARY OF THE DISCLOSURE

It is an object of the invention to provide a CBRN risk and threat training system which overcomes one or more of the drawbacks or limitations of existing education and training techniques.

According to an aspect, a chemical, biological, radiological and nuclear CBRN risk training system is proposed using a virtual reality scenario, characterized in that the system comprises a CBRN-AR augmented virtual reality mask:
- a virtual reality screen;
- at least one main processing module comprising a main microprocessor;
- at least one graphics processing module comprising a graphics microprocessor for broadcasting images of the virtual reality scenario on the virtual reality screen;
- at least one main processing module comprising a main microprocessor;
- a memory comprising the, at least one, virtual reality scenario;
- at least one biometric sensor measuring a physiological parameter of a user of the CBRN-AR mask during the execution of said virtual reality scenario;
- at least one stress actuator modifying an internal environmental parameter of the mask during the execution of said virtual reality scenario, said stress actuator comprising a valve with controlled opening which directs air towards the interior of the CBRN-AR mask so as to regulate an incoming air flow; and the main microprocessor of the main processing module is arranged for:
- controlling the graphics microprocessor of the graphics processing module to broadcast said virtual reality scenario on the virtual reality screen;
- comparing the physiological parameter of the user with a reference physiological value; and
- adapting said virtual reality scenario in real time by controlling the stress actuator in real time to modify at least one internal environmental parameter of the mask, said modification of at least one internal environmental parameter of the mask consisting at least in operating the valve with controlled opening to regulate the flow of incoming air flow so as to reduce the arrival of air flow to increase a state of stress of the user or to increase the arrival of air flow to reduce said state of stress of the user.

The biometric sensor may be selected from a pulse sensor, a body temperature sensor, a sensor for measuring blood oxygen saturation, electrodes for measuring the electrical activity of the brain, a sensor for measuring respiratory rate, a sensor for measuring the diameter of the pupil, and/or a sensor for measuring the electrodermal conductance.

The stress actuator may further comprise a heating resistor and/or an electrode generating an electric discharge.

The CBRN-AR augmented virtual reality mask may further comprise a filter cartridge, said filter cartridge being equipped with the controlled opening valve.

The CBRN-AR augmented virtual reality mask may be coupled to an external respirator via the controlled opening valve.

The filter cartridge or the external respirator may be equipped with an odor generator, for example one or more gas capsules or tablets releasing a specific odor.

The filter cartridge may include a battery.

The CBRN-AR augmented virtual reality mask may comprise an electronic board integrating the graphics processing module, the main processing module and the memory, said electronic board being connected to at least one virtual reality camera, at least one audio module, and/or at least one wired or wireless connection integrated into said mask.

The system may further comprise a control module interconnected with the CBRN-AR mask, the control module comprising a library comprising virtual reality scenarios, at least one virtual reality scenario being uploaded to the memory of the augmented virtual reality CBRN-AR mask before the execution of said virtual reality scenario.

The system may further comprise at least one container-type object and at least one detector-type object interconnected together as well as with the control module and the CBRN-AR mask.

Each of the objects of container-type and detector-type may include a secondary microprocessor connected to a plurality of sensors and actuators, the secondary microprocessor being arranged to activate one or more functions of said sensors and actuators during the execution of said virtual reality scenario.

According to another aspect, there is provided a chemical, biological, radiological and nuclear CBRN risk training computer program using a virtual reality scenario, the computer program comprising program code instructions for the execution of following steps when the program is executed by a microprocessor of a training system comprising an CBRN-AR augmented virtual reality mask executing a virtual reality scenario by broadcasting images to a user wearing the CBRN-AR augmented virtual reality mask measuring in real time at least one physiological parameter of a user of the CBRN-AR mask during the execution of said virtual reality scenario comparing the, at least one, physiological parameter of the user with a, at least one, reference physiological value adapting said virtual reality scenario in real time by controlling a state of stress of the user in real time by modifying at least one internal environmental parameter of the CBRN-AR augmented virtual reality mask during the execution of said virtual reality scenario, said modification of at least one internal environmental parameter of the mask consisting at least in regulating the flow of incoming air flow inside the CBRN-AR mask so as to reduce the arrival of air flow to increase the state of stress of the user or to increase the arrival of air flow to reduce said state of stress of the user.

Said modification of at least one internal environmental parameter inside the mask may also consist of heating the air inside the mask and/or generating an electric discharge inside the mask.

The invention is particularly applicable for reproducing or simulating an environment presenting an CBRN risk or threat in order to improve the skills of said security and defense personnel without them suffering the consequences of their failures. The training system according to the invention also has the following advantages:

The scenarios correspond to standardized exercises, making it possible to qualify/certify the personal according to the CBRN standards in force;

The system makes it possible to better prepare security and defense personnel to face the reality of the risk(s) and threats with which they will be confronted;

The system does not require setting up complex training infrastructures;

The system can be used to educate and train security and defense personnel or a group of security and defense members; and The system is structurally light, compact and easy to install, so it is particularly suitable for itinerant/mobile training.

Other advantages will emerge from the following description of the invention.

BRIEF DESCRIPTION OF THE DRAWINGS

The present invention is illustrated by way of examples and not limited to the accompanying drawings, in which similar references indicate similar elements.

DETAILED DESCRIPTION

The invention will be understood from the following description, in which reference is made to the accompanying drawings.

The CBRN risk and threat training system 1 according to the invention comprises a mask 2 using augmented virtual reality CBRN-AR. Augmented virtual reality (otherwise known as immersive multimedia or computer-simulated reality) is a computer technology that replicates an environment, real or imagined, and simulates a user's presence and physical surroundings to enable a person's interaction, here for security and defense personnel during educational or training sessions. Virtual reality artificially creates a sensory experience, which can include but is not limited to sight, touch, hearing, smell and heat perception. The purpose of virtual reality is to allow a person (or several) to live a sensory-motor and cognitive activity in an artificial world, created digitally, which may be "imaginary, symbolic or a simulation of certain aspects of the real world" in order to provide an immersion.

Figure 1:
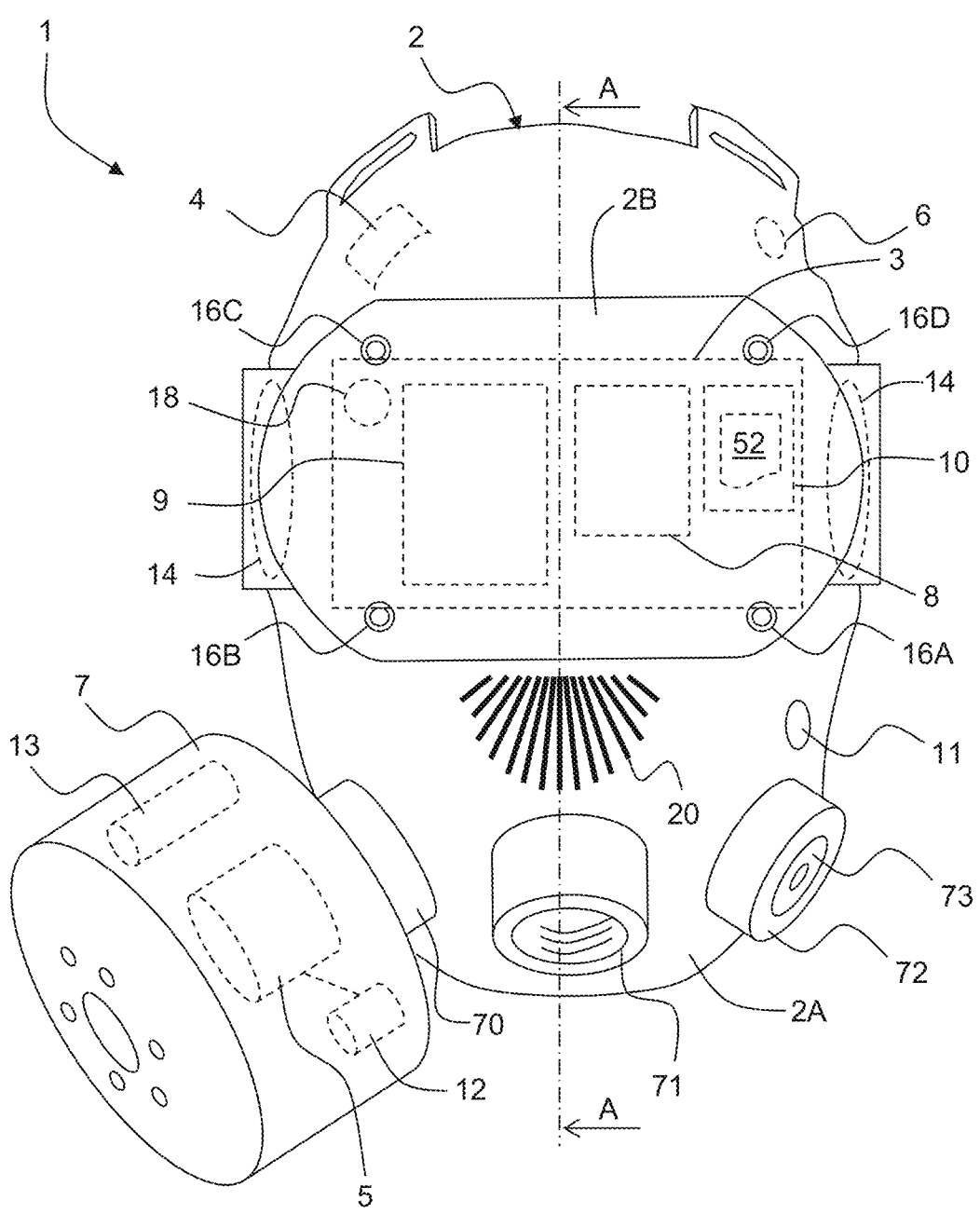
FIG. 1, FIG. 2, FIG. 3 and FIG. 4 are schematic views, from the front, from below, in side perspective and from the side, illustrating a CBRN-AR mask with a filter cartridge according to the invention, respectively.
Figure 2:
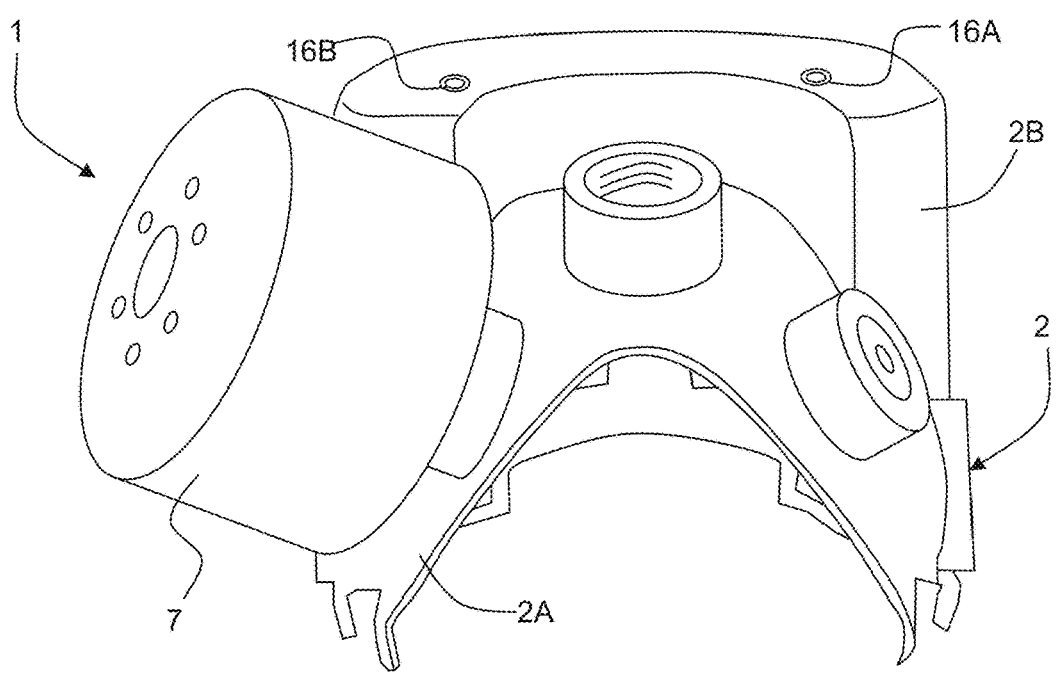
Figure 3:
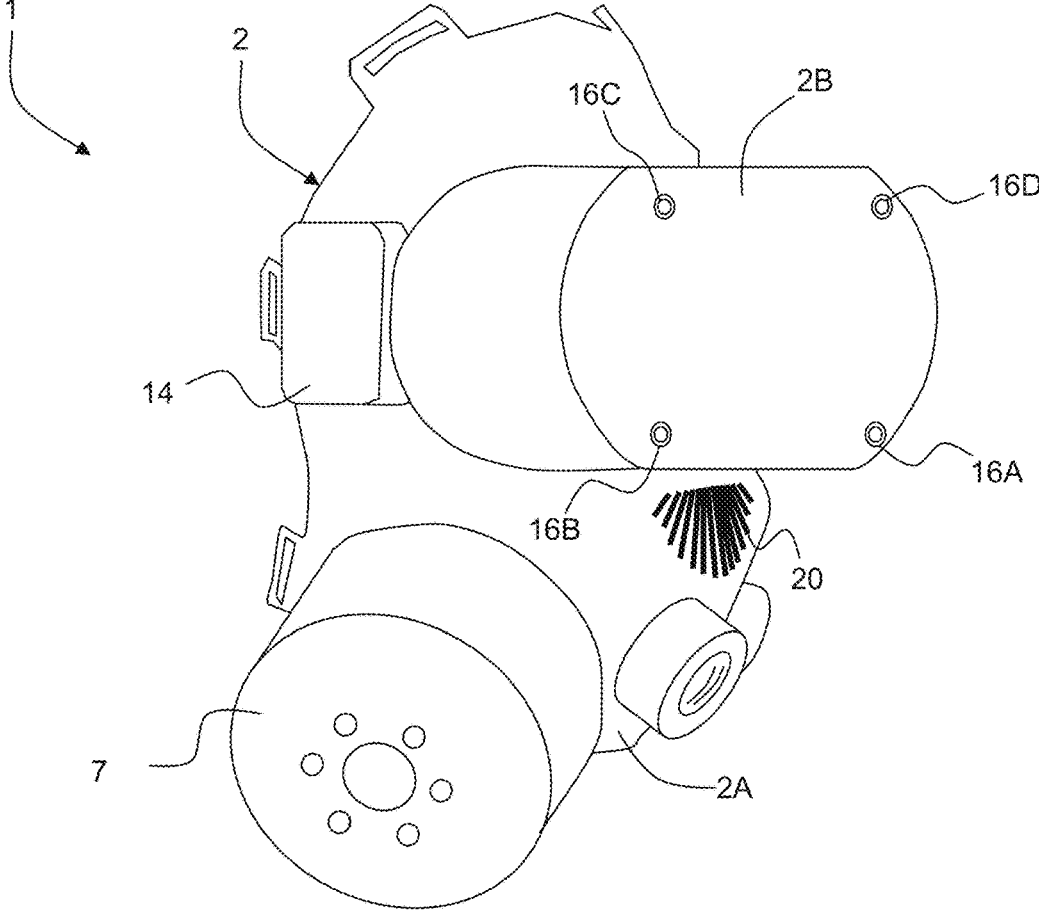
Figure 4:
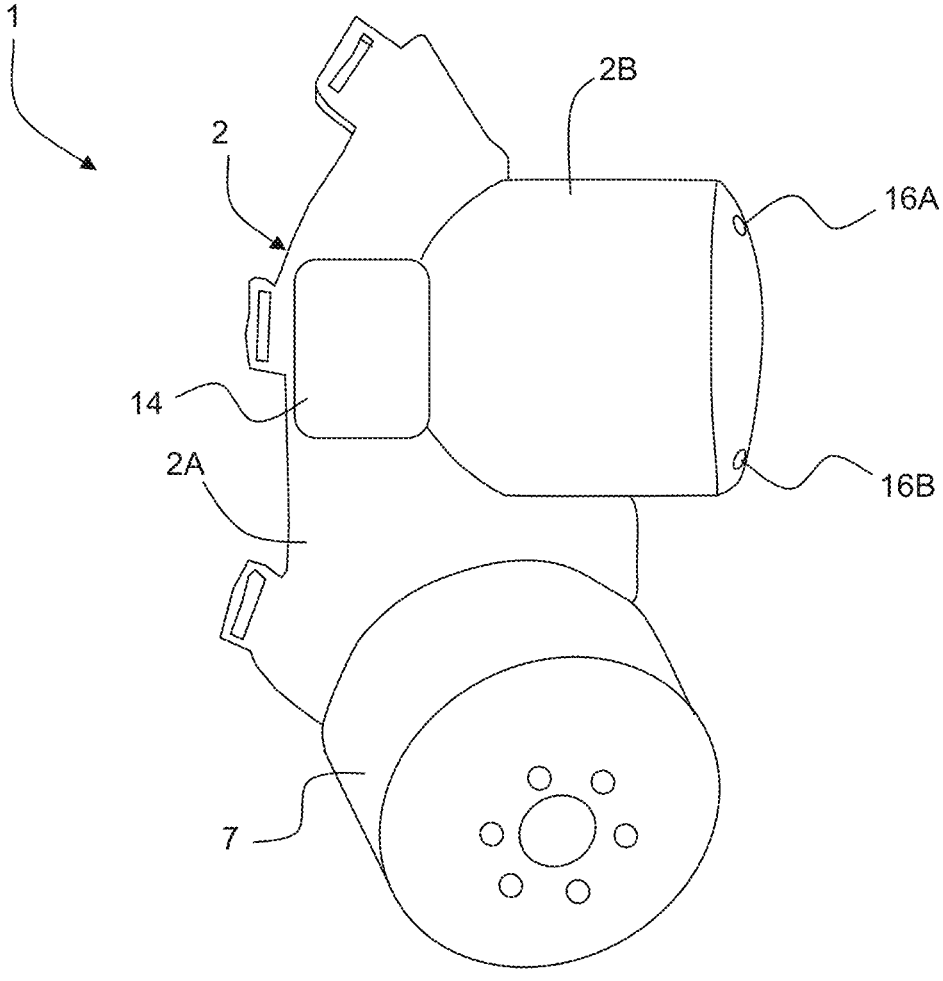
Figure 5:
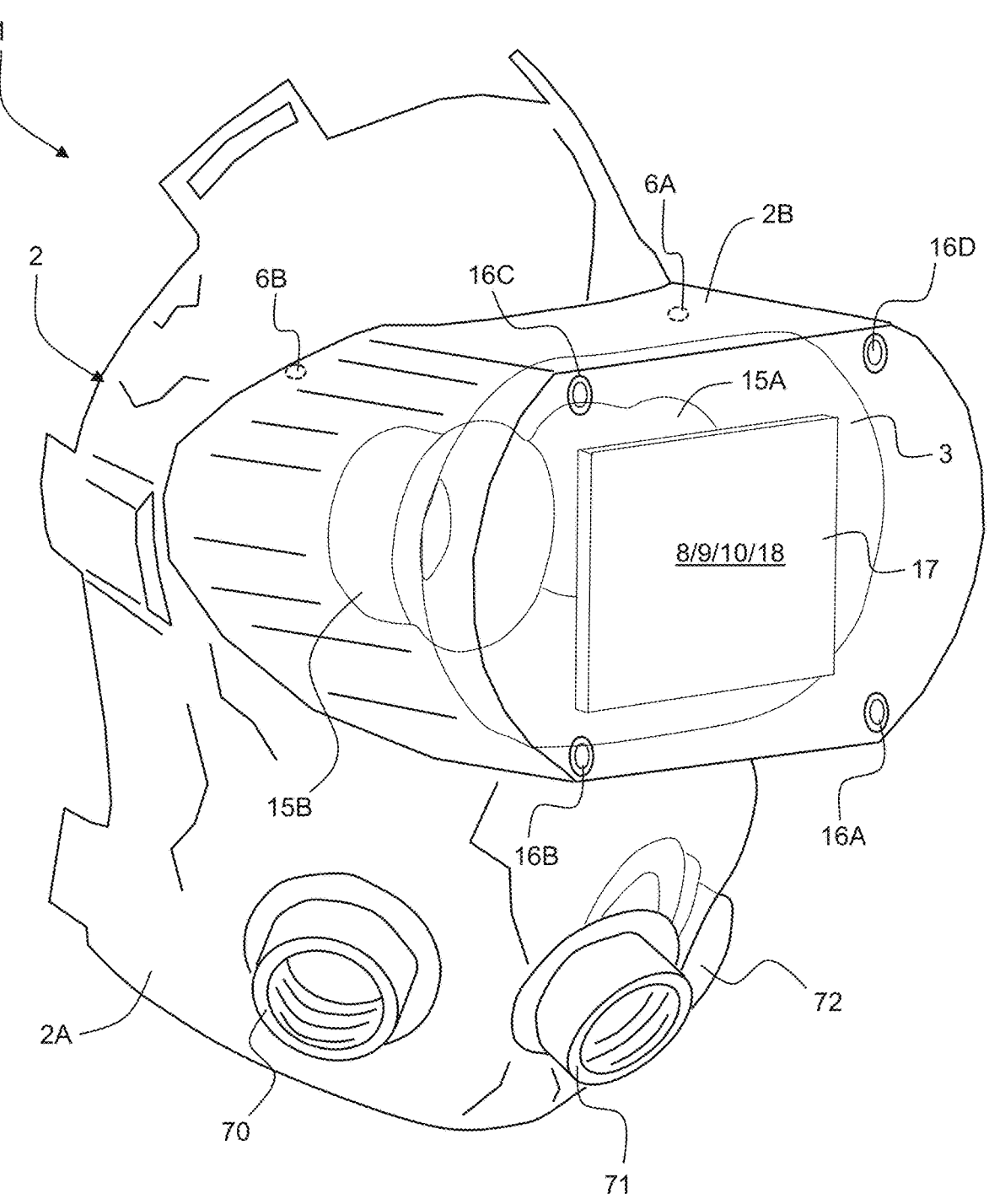
FIG. 5 is a schematic perspective view from the side and semi-transparent illustrating a CBRN-AR mask without filter cartridge according to the invention.
Figure 6:
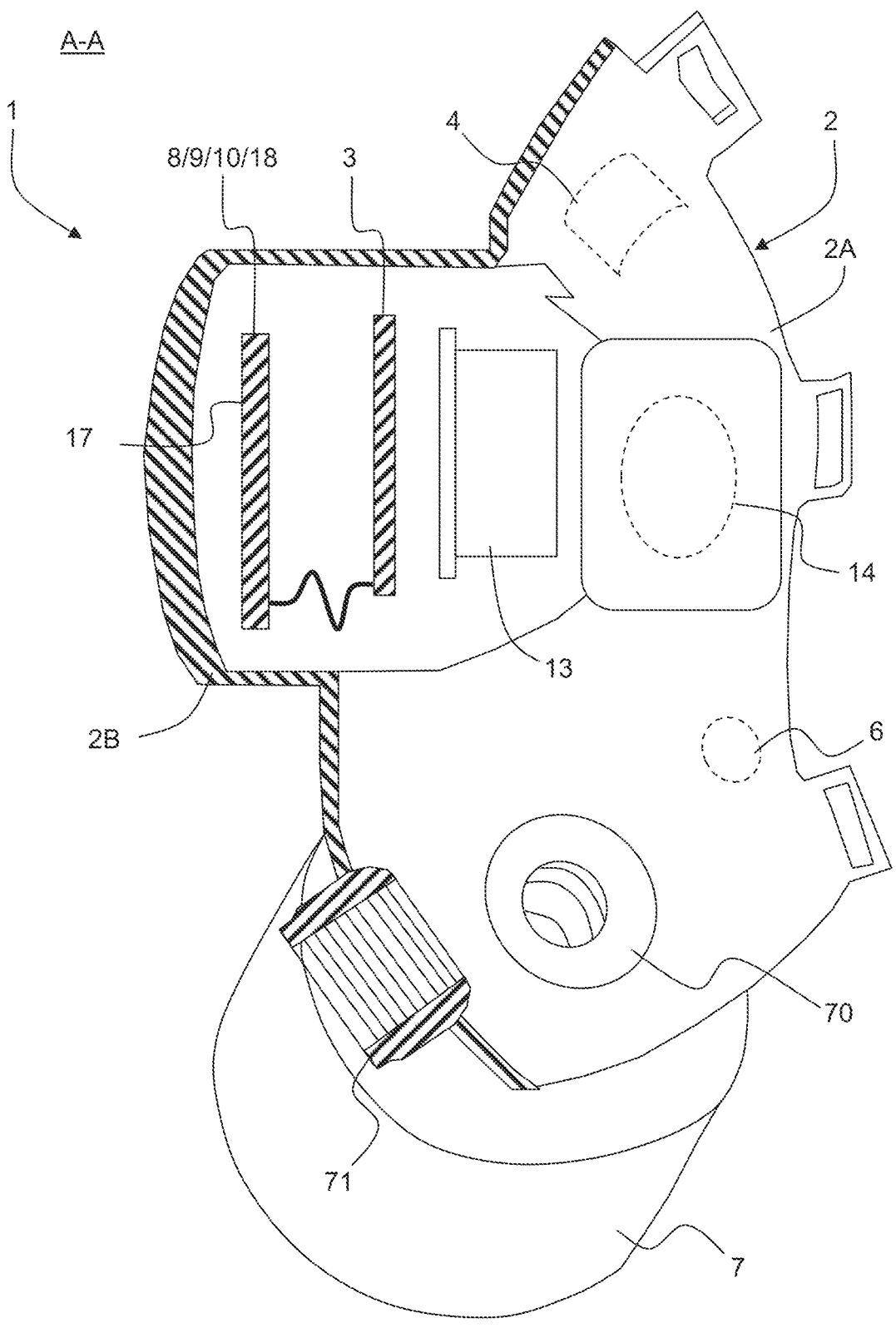
FIG. 6 is a sectional view along A-A of FIG. 1 illustrating a CBRN-AR mask with a filter cartridge according to the invention.
Figure 8:
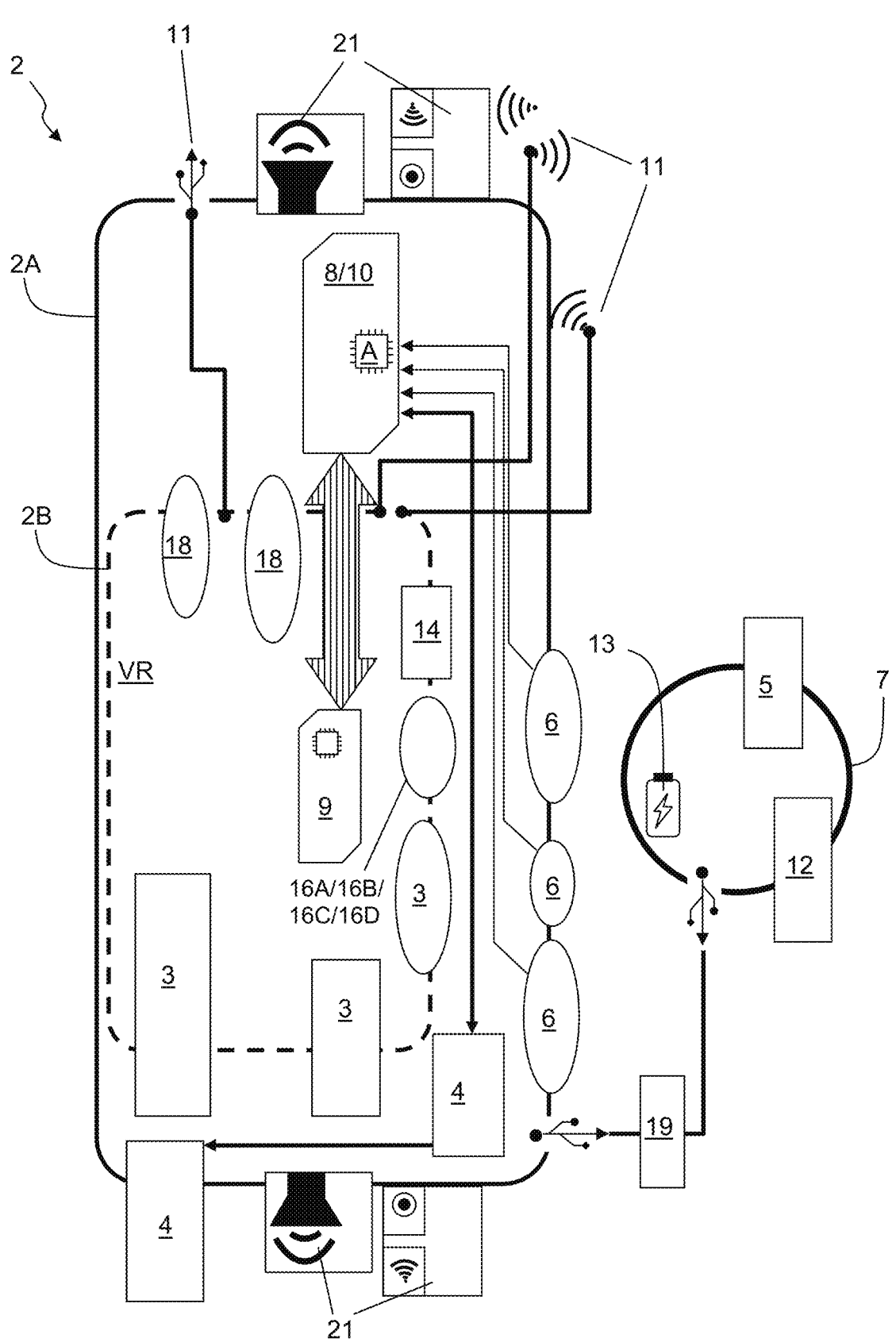

FIG. 1 is a schematic front view of the CBRN-AR mask 2 with a filter cartridge according to the invention. FIG. 2 is a schematic bottom view of the mask 2. FIG. 3 is a schematic side perspective view of the mask 2. FIG. 4 is a schematic side view of the mask 2. FIG. 5 is a schematic semi-transparent side perspective view of the mask 2 without a filter cartridge. FIG. 6 is a sectional view along AA of FIG. 1 of mask 2 with a filter cartridge. FIG. 8 illustrates by a synoptic representation the constitutive elements and functions of the CBRN-AR mask 2.

The mask using augmented reality CBRN-AR 2 used for training reproduces the real characteristics of an CBRN mask, namely protection of the face and respiratory tract of the user who wears it, comfort over time, and optimum ergonomics. The CBRN-AR mask 2 comprises a virtual reality screen 3, at least one graphics processing module 9 comprising a graphics microprocessor, at least one main processing module 8 comprising a main microprocessor, a memory 10 comprising a library comprising the at least one virtual reality scenario, at least one virtual reality camera 16A, 16B, 16C and 16D, at least one biometric sensor 6, at least one stress actuator 4, at least one audio module 14, and at least one wired or wireless connector 11. According to the embodiment of FIG. 1 to FIG. 6, the CBRN-AR mask 2 may comprise at least one filter cartridge 7. The CBRN-AR mask 2 comprises a first part 2A forming the CBRN mask with additional functions which will be described hereinafter, and a second part 2B forming a virtual reality VR headset.

Generally, the first part 2A consists of a mixture of chloro-butyl and silicone, allowing the mask to be flexible, comfortable to wear over time and easily adjustable to a large number of user face morphologies. This mixture reproduces the usual protection and waterproofing characteristics. Alternatively, the first part 2A may consist of a rigid shell to integrate all the elements of the CBRN-AR mask 2 and of a face/CBRN-AR 2 mask interface in chloro-butyl and silicone. The mask is equipped with an air vent and a sound patch 20 on the front face, possibly also in the high position of the mask. This air evacuation and acoustic patch 20 allow an outward flow of air to reduce the accumulation of damp heat and prevent fogging on the virtual reality screen 3, and also to transmit the voice of the user towards the outside.

The figures show the first and second parts 2A and 2B as being integrally combined together to form a complete assembly.

Alternatively, the first and the second part 2A and 2B may be distinct so that the virtual reality VR headset is removable from the CBRN mask itself. In this case, in order to preserve a total tightness, to allow a shutter of the external light and to achieve a feeling of confinement of the face under the mask, a bellows in chloro-butyl and silicone is positioned between the CBRN mask and the virtual reality VR headset. This bellows also makes it possible to offer a depth adjustment which confers a certain mobility of the virtual reality VR headset relative to the CBRN mask while being combined with one another.

The mask comprises one or more biometric sensors 6. The biometric sensor 6 measures a physiological parameter of the user of the CBRN-AR mask during the execution of said virtual reality scenario. The biometric sensor 6 can be a pulse sensor (measurement of the heart rate), and/or a body temperature sensor, and/or a sensor for measuring the oxygen saturation of the blood, and/or electrodes for measuring the electrical activity of the brain (electroencephalography EEG), and/or a sensor for measuring the respiratory rate, and/or a pupillometer (measurement of the diameter of the pupil), and/or a sensor for measuring the electrodermal conductance of the user wearing the mask. The biometric sensor(s) 6 may be integrated into the front part of the mask or be positioned on the left and right temporal part. The biometric sensor(s) 6 are connected to the microprocessor of the main processing module 8 and transmit vital data corresponding to physiological parameters of the user wearing the mask. These physiological parameters provide information on the state of stress or breathing difficulties of the user during the execution of the virtual reality scenario. A wired sensor connection network (not shown for reasons of clarity of the drawings) may pass through the inner lining of the mask up to the electronic card 17.

Preferably, the stress actuator 4 is made by means of the controlled opening valve 5 which directs the outside air towards the inside of the mask so as to regulate the flow of incoming air. The controlled opening valve 5 may be positioned in the filter cartridge 7 or at the level of an external respirator 80 for reasons of space, but also directly integrated into the mask. The controlled opening valve 5 allows management of the incoming air flow. In one mode of operation, the controlled opening valve 5 may be operated in such a way as to considerably reduce the arrival of air flow, this to simulate particular training conditions (i.e. lack of breathable air) and cause stress to the user. On the other hand, the controlled opening valve 5 may be operated in such a way as to increase the arrival of air flow to reduce the user's stress. The controlled opening valve 5 also makes it possible to simulate the reality of an exercise more faithfully. For example, entering a smoky zone causing a reduction in breathable air can be simulated by a pressure drop resulting from the reduction in the arrival of the air flow, then leaving said zone to enter a zone free of smoke can be simulated by an increase in the arrival of the air flow. Thus, the controlled opening valve 5 makes it possible to modulate the stress of the user to reproduce or simulate an environment presenting a CBRN risk or threat in the context of training.

The stress actuator 4 can also be for example a heating resistor, for example a heating sheet intended to make the user feel a sensation of heat. As an alternative, the stress actuator 4 may for example be one or more electrodes intended to cause the user to feel an electric shock (an electric shock is understood to mean a low intensity discharge capable of creating a tingling). A combination of several types of stress actuator is possible. Although the stress actuator 4 is illustrated as positioned at the level of the mask in contact with the upper part of the user's face, it may be positioned at another suitable place (for example at the level of the cheeks) or at multiple locations on the mask to affect different parts of the user's face. The stress actuator 4 is controlled by the main processing module 8 and connected to the electronic card 17. Alternatively, one or more stress actuators 4 may be placed on the user's body or in the user's outfit. The filter cartridge 7 may be coupled to the first part 2A via a right 70, face 71 and left 72 tapped/threaded hole type cartridge connector. The positioning of a side cartridge on the right or left side or of two side cartridges allows the user to lower his head easily, which improves the comfort of the user according to the proposed training scenario. A cartridge may also be positioned on the front face. The filter cartridge 7 may be equipped with the controlled opening valve 5 which directs the outside air towards the face. Optionally, the filter cartridge 7 can be equipped with an odor generator 12, for example one or more gas capsules or tablets releasing a specific odor, for example via the controlled opening valve 5 within the incoming air flow.

Advantageously, the filter cartridge 7 may comprise a battery 13. The capacities of the batteries available on the market offer a limited autonomy for the operation of the whole of the CBRN-AR mask 2. The filter cartridge 7 being removable, it is possible to replace the filter cartridge 7 during the progress of or between teaching sequences by another filter cartridge. Advantageously, the battery 13 may be rechargeable. Alternatively, the CBRN-AR mask 2 may be connected to external batteries that may be transported by belt or shoulder strap, or inside a bag. Advantageously, these sets of batteries (by cartridges or external) may power an CBRN-AR mask 2 with the possibility of adjusting and adapting the number of batteries according to the desired duration to cover the entire duration of a training and practice session. The filter cartridge 7 may be connected to the electronic card 17 by a cartridge interface 19 such as a wired connection, for example USB (Universal Serial Bus) of C-type (i.e. USB-C standard).

The unused right 70, face 71 and left 72 connectors are generally fitted with a blanking plug or an air vent valve 73.

The right 70, front 71 and left 72 connectors may also be used to couple a self-contained breathing type apparatus SCBA (not shown).

Figure 12:
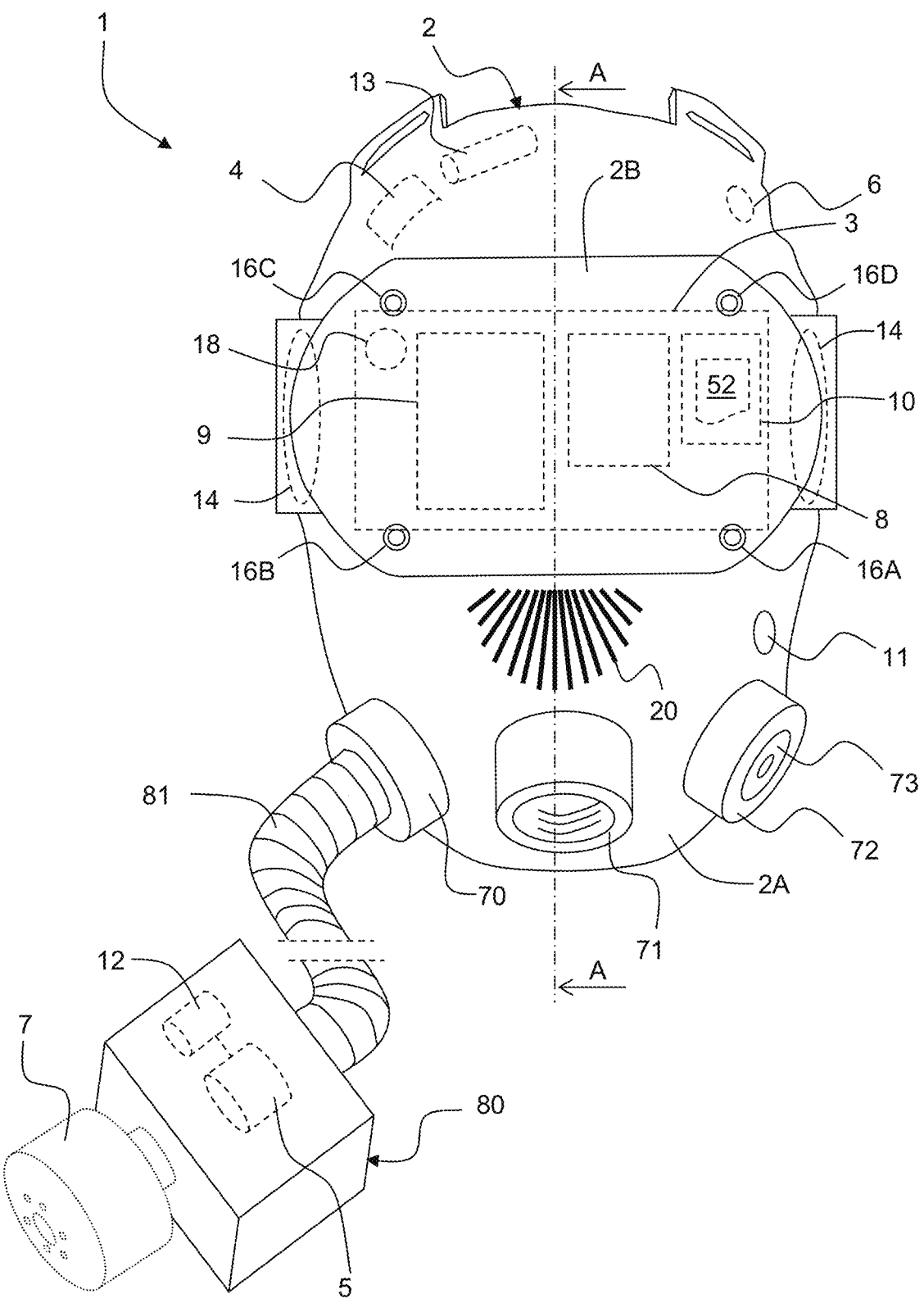
FIG. 12 is a schematic front perspective view illustrating a CBRN-AR mask according to another embodiment of the invention with an external respirator.

FIG. 12 is a schematic front perspective view illustrating an CBRN-AR mask 2 according to another embodiment of the invention in which the mask is coupled to an external respirator 80 via a flexible hose 81 and the controlled-opening valve 5. This example embodiment differs from the example embodiment of Figures FIGS. 1 to 6 in that the controlled-opening valve 5 is offset into the external respirator 80. According to the example presented, the external respirator 80 can be provided with the filter cartridge 7 (in dotted line) and the odor generator 12. In the example, the battery 13 is positioned in a defined zone of the first part 2A. According to another example not shown, the external respirator 80 may be of the self-contained breathing type apparatus SCBA without a filter cartridge, since the air then comes from a bottle.

The virtual reality VR headset of the second part 2B comprises a virtual reality screen 3 of the panoramic type having a large field of vision. It further comprises binocular optics comprising lenses 15A, 15B allowing optical correction to eliminate any risk of distorted vision. It comprises the graphics processing module 9 comprising the graphics microprocessor. Position sensors 18 are integrated in the virtual reality VR headset of the second part 2B or in the first part of 2A, such as gyroscope, magnetometer and accelerometer to detect the movements and gestures of the user. They are advantageously integrated into the electronic card 17 (see FIG. 6). These movements and gestures are applied to the images recalculated in real time by the graphics microprocessor according to the information transmitted by the position sensors to match the movements and gestures of the user. Further, it comprises at least one virtual reality VR camera, advantageously four cameras 16A, 16B, 16C and 16D connected to the graphics microprocessor to integrate interactions with objects of the type container 30 (see FIG. 7 and FIG. 9) or detector 40 (see FIG. 7 and FIG. 10) and apply them to the recalculated images in real time. The virtual reality VR headset also includes an audio module 14, for example at least one earpiece, preferably one on each side of the face substantially at the height of the user's ears.

The second part 2B may be made of the same material as the first part 2A. Alternatively, it may include an outer molding in flexible materials and may withstand stressful trainings, for example shocks without affecting the operation of the constituting elements of the headset.

Advantageously, the mask integrates substantially at the level of the second part 2B the electronic card 17. The electronic card 17 includes the graphics processing module 9, the main processing module 8 and the memory 10. The graphics processing module 9 includes the microprocessor graphic dedicated to the virtual reality screen 3, and is connected to the audio module 14 and to the virtual reality cameras 16A, 16B, 16C and 16D. The main processing module 8 comprises the main microprocessor dedicated to the operating system, to the control of the execution of the training and practice scenario, to the reception of the measurements from the biometric sensor(s) 6, to the control of the stress actuator(s) 4, to the control of the cartridge (valve 5 and odor generator 12) and to the management of the connections to the outside 11. The memory 10 is connected to the main processing module 8 and contains at least the scenario of virtual reality 52 loaded for current training and practice session. In a particular embodiment, if the memory is large enough, the memory may include a library comprising several virtual reality scenarios.

The external connection 11 may be of the wired or wireless type, for example USB, mini-USB, standardized Ethernet cabling (e.g. RJ45), Wi-Fi (Wireless Fidelity), Bluetooth (registered name), etc. . . .

The CBRN-AR mask 2 may include a hydration device allowing the user to stay hydrated throughout a training exercise (not shown in the figures). The CBRN-AR mask 2 may be equipped with other accessories (not shown) to adapt to the operational conditions of training and practice, such as harness, voice and microphone amplifier, vision device under the mask, communication device for multi-participant exercises, an interface with personal protective equipment PPE, and an interface with means appropriate to the CBRN risks and threats considered in the training scenario (e.g. detector), etc. . . .

Figure 7:
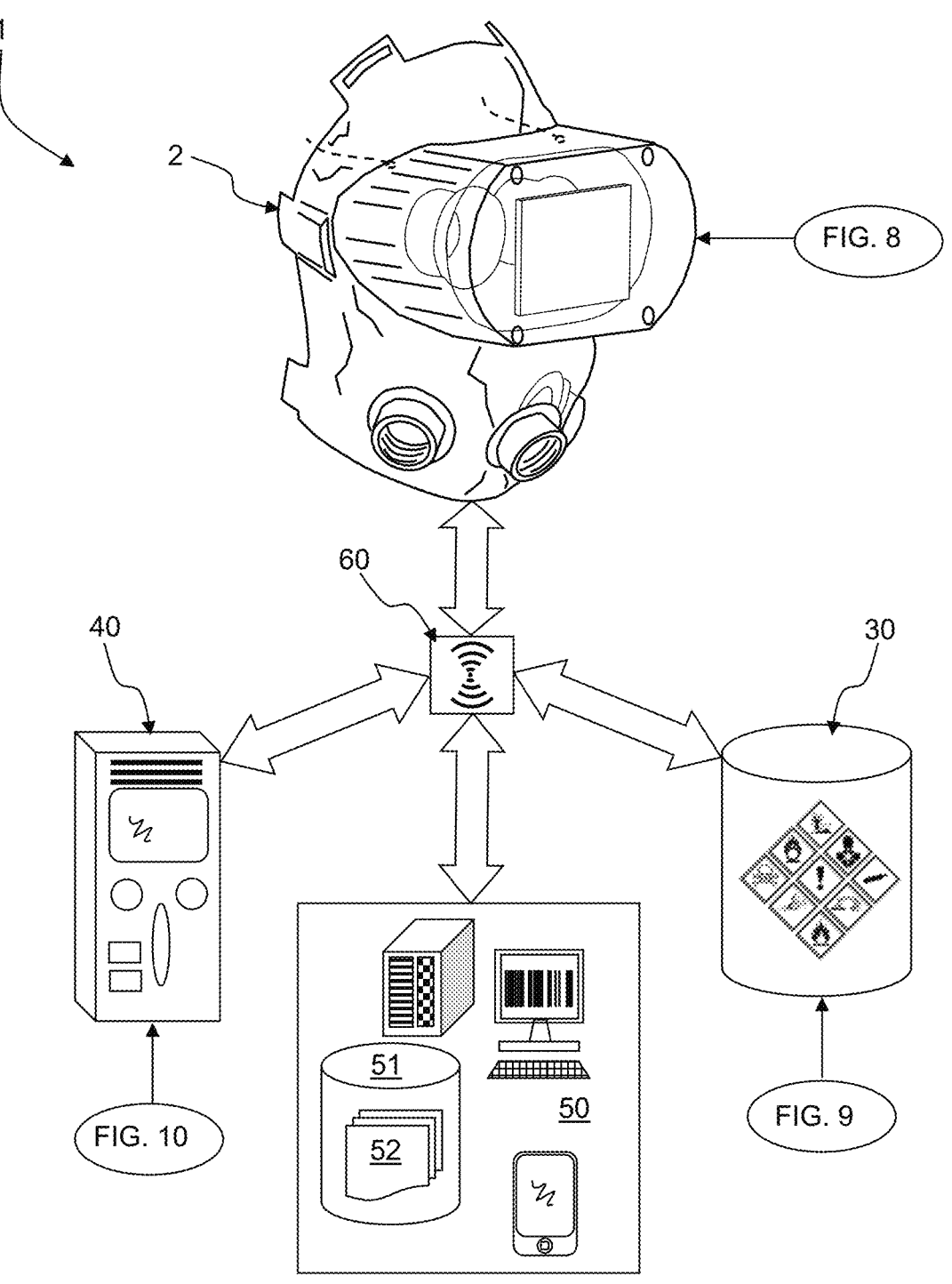
FIG. 7, FIG. 8, FIG. 9 and FIG. 10 are schematic views of the CBRN-AR risk training system according to the invention, illustrating the complete system according to a particular embodiment, block diagrams of the constitutive elements and functions respectively of the CBRN-AR mask, of a container-type object and a detector-type object, respectively.
Figure 9:
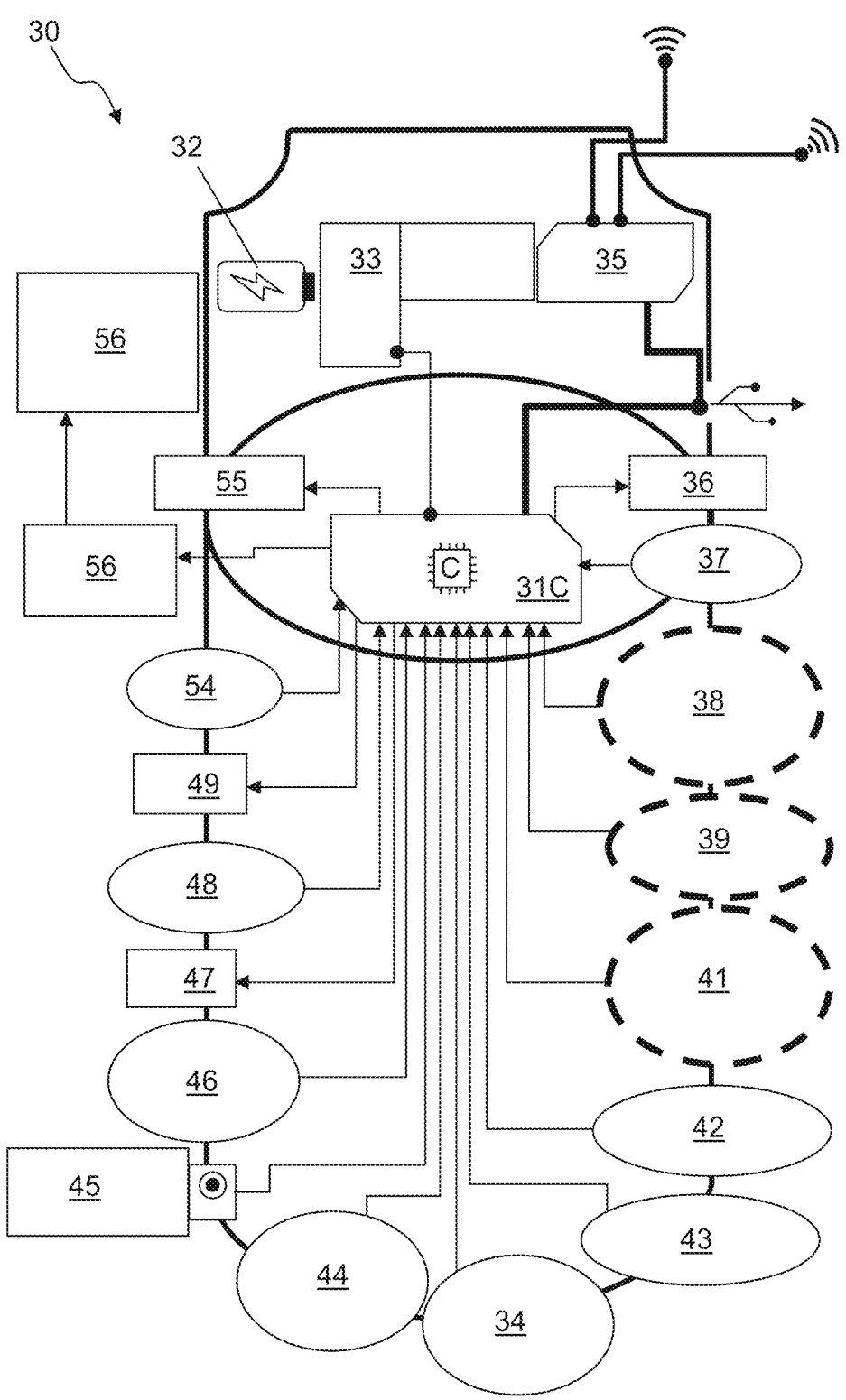
Figure 10:
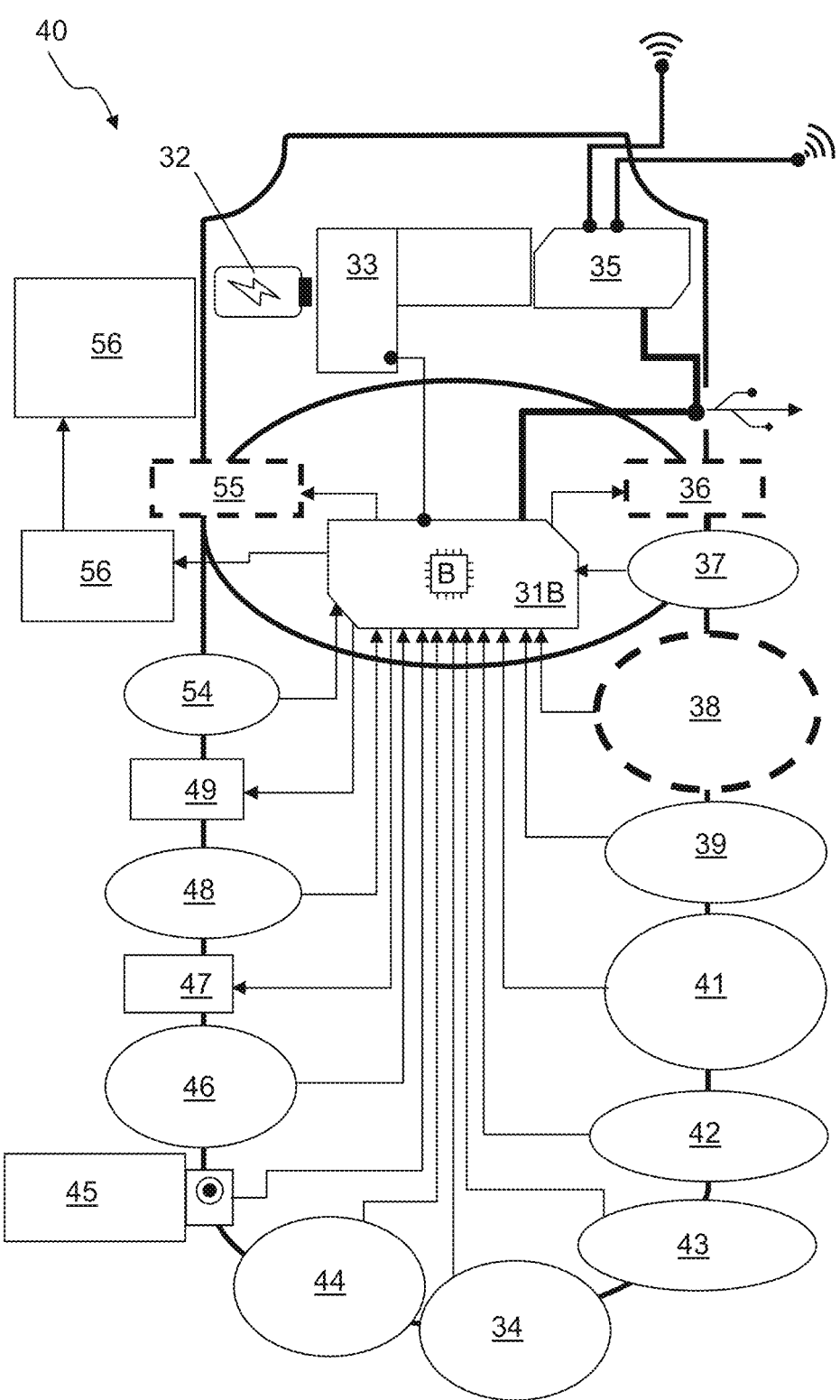

FIG. 7 is an overall schematic view of an embodiment of the CBRN risk and threat training system 1, illustrating the complete system with these constitutive elements and their functions, namely an CBRN-AR mask 2, a control module 50, a container type object 30, a detector type object 40 interconnected by a wireless router 60 (i.e. WiFi). FIG. 8 schematically illustrates the constitutive elements and functions of the CBRN-AR mask 2. FIG. 9 schematically illustrates the constitutive elements and functions of a container-type object 30. FIG. 10 schematically illustrates the constitutive elements and functions of a detector type object 40.

It should be noted that in the training system according to the invention, the execution of a virtual reality scenario does not necessarily make use of all the elements, only the CBRN-AR mask 2 is essential. For example, in a scenario of training in scouting in a building on fire for a user having the function of firefighter, the CBRN-AR mask 2 simulates the heat by the activation of the stress actuator 4 of the heating resistor type, gas and smoke emissions by blurring the images on the virtual reality screen 3 and the reduction of oxygen saturation by reducing the flow of air through the controlled opening valve 5.

According to one embodiment of the training system 1 in CBRN risks and threats, the CBRN-AR mask 2, the container-type object 30 and the detector-type object 40 are interconnected by wire (e.g. USB cable) or wireless (e.g. WiFi router). A user in exercise or training wears the CBRN-AR mask 2. An instructor/trainer has a control module 50, for example a digital tablet or a computer. The control module 50 comprises a library 51 comprising at least one virtual reality scenario 52. The scenario or scenarios proposed by the instructor/trainer in the CBRN atmosphere make(s) it possible to recreate events of a nuclear, radiological, biological, chemical and explosive context. For example, for the education and training of firefighters, the scenarios can simulate fires in cellars, kitchens, bedrooms and stairwells. The exercise is directed and under the control of a firefighter designated as the instructor/trainer. As part of education or training, he may be in radio contact with the user, develop the different phases provided for by the educational scenario or let the scenario evolve automatically, and intervene at any time with the user to reframe the exercise.

It is understood that the user of the CBRN-AR mask 2 may also be equipped with a complete CBRN outfit (not shown on the drawings) in order to best simulate a context of intervention in CBRN risks and threats. Once the headset is positioned on the user's face and the complete CBRN outfit is closed, during educational and training sessions, if a situation requires stopping the exercise, the cameras of the virtual reality headset, the audio module and the loudspeakers may allow a visual and auditory exchange with an instructor/trainer without having to carry out a complete undressing of the CBRN outfit.

The constitutive elements and functions of the CBRN-AR mask 2 illustrated in FIG. 8 include the graphics microprocessor in a control board VR (graphics processing module 9) connected by a wired network to the main microprocessor (main processing module 8). The graphics microprocessor in the control board VR is connected to the gyroscope, to the accelerometer (position sensors 18), to the audio module 14, to the virtual reality cameras 16, 16A, 16B, 16C and 16D. It controls the virtual reality screen 3, i.e. light intensity, balance (to cause visual disturbances) and a retinal reader. The main microprocessor 8 is connected to the oxygen saturation sensors, pulse sensor and temperature sensor (biometric sensor 6), a power unit connected to a heating resistor (the stress actuator 4), a communication interface (wired or wireless connectors 11, for example USB, Bluetooth, WiFi), to the filter cartridge 7 via a cartridge interface 19 and its appropriate connectors (e.g. USB-C). The CBRN-AR mask 2 may also comprise sets of left and right loudspeakers 21 connected respectively to a left and right jack socket.

The container-type object 30 is intended to represent any object and its contents, for example a gaseous, liquid or solid product. The detector-type object 40 is intended to represent sampling equipment, a detector/analyzer of chemical/biological product or radiation.

The constitutive parts and functions of the container-type object 30 shown in FIG. 9 or the detector-type object 40 illustrated in FIG. 10 may include a main processing module comprising a secondary microprocessor B for the container 31C and a secondary microprocessor C for the detector 31B, a battery 32, a screen 33, a keyboard 34, a communication interface 35, an audio module 36, a microphone 37, a proximity sensor 38, a gyroscope 39, a level sensor 41, a humidity sensor 42, an accelerometer 43, a weight sensor 44, an analog input 45, a haptic sensor 46, a light emitting diode 47 (e.g. IR LED), a temperature sensor 48, a laser 49, a camera 54, a vibrator 55 and a power unit connected to a heating resistor, motor or other current consumer 56.

Whether it is the container-type object 30 or the detector-type object 40, they are endowed with the same electronic structure to represent a kind of universal object to which a specific function will be attributed to it according to the foreseen educational and training scenario.

According to a particular embodiment in which the container-type object 30 illustrated in FIG. 9 represents a container filled with chemical product in the scenario, only the proximity sensors 38, gyroscope 39 and level sensor 41 are activated (the activated constitutive elements or the activated functions are surrounded by a broken line). The proximity sensor 38 makes it possible to detect the approach of the user (or of an object held by the user or the hand of the user). The gyroscope 39 makes it possible to detect whether the container has been overturned. The level sensor 41 makes it possible to simulate the level of liquid during a manipulation.

According to another particular embodiment in which the detector-type object 40 illustrated in FIG. 10 represents a radiation detector (i.e. Geiger counter) in the scenario, only the audio module 36, the proximity sensor 38 and the vibrator 55 are activated (the activated constitutive elements or the activated functions are surrounded by a broken line). The proximity sensor 38 makes it possible to detect the approach of a container-type object by the detector held by the user. The audio module 36 and the vibrator 55 enables through sounds and vibrations simulating the intensity of the radiation measured by the detector.

Figure 11:
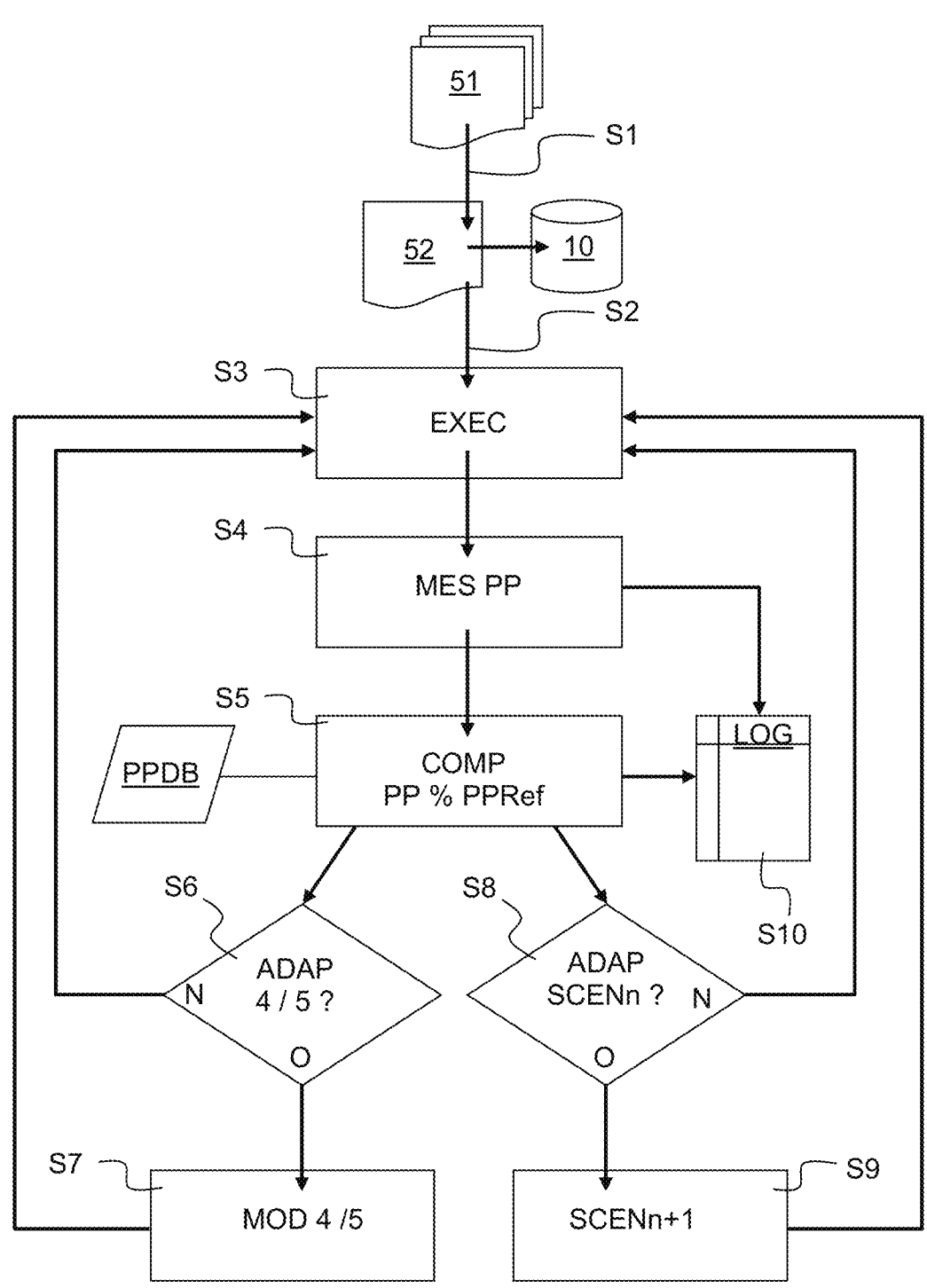
FIG. 11 schematically illustrates a training method using the CBRN-AR risk training system according to the invention.

Figure FIG. 11 schematically illustrates a training method using the training system in CBRN risk and threat according to the invention. This method is implemented by a computer program for training in chemical, biological, radiological and nuclear CBRN risks. A virtual reality scenario 52 is chosen (step S1) from a library of scenarios 51, then loaded (step S2) into the augmented virtual reality CBRN-AR mask 2. The virtual reality scenario 52 is executed (EXEC—step S3) by broadcasting images to a user wearing the augmented virtual reality CBRN-AR mask 2. In real time and continuously, at least one physiological parameter PP of the user is measured (MES PP—step S4) during execution of said virtual reality scenario 52. This or these physiological parameters PP are compared (COMP PP % PPRef—step S5) with at least one physiological reference value PPRef. Reference physiological values PPRef are stored in a PPDB database. The virtual reality scenario 52 is adapted in real time as a function of this comparison by controlling the stress state of the user in real time, either by adapting at least one internal environmental parameter of the CBRN-AR mask 2 (ADAP 4/5?—step S6), either by adapting the virtual reality scenario 52 itself (ADAP SCENn?—step S8), or both. It is possible to modify (MOD 4/5—step S7) at least one internal environmental parameter of the CBRN-AR mask 2, by acting on an actuator 4 or on the valve of the cartridge 5 as explained hereinbefore. It is also possible to modify (SCENn+1—step S9) the virtual reality scenario 52 offered to the user, for example for a scenario more suited to the skill level of the user. The execution of the virtual reality scenario is continued to completion with the new data. The measured physiological parameters PP of the user as well as the adaptations of the environmental parameters and/or the adaptations of the scenario may advantageously be recorded during the execution of the virtual reality scenario 52 in a log (LOG—step S10).

The training system and method 1 can be controlled in several ways:

either in a so-called "manual" mode wherein an instructor pilots via the control module (PC or tablet) 50, the entire progress of the training session, it is then the instructor who decides the performing of steps S6 and S8;

either in a so-called "autonomous" mode without an instructor and without a control module (PC or tablet) 50, wherein the entire progress of the training session is decided by the automatic execution of steps S6 and S8 according to reference data and threshold provided in the virtual reality scenario 52;

or in a so-called "intelligent" mode wherein the instructor is replaced by a control module (PC or tablet) 50, capable of producing intelligent behavior (e.g. of the artificial intelligence type) wherein the entire course of the training session is decided by the automatic execution of steps S6 and S8 as a function of reference and threshold data provided in the virtual reality scenario

52, and a scalable database making it possible to avoid the repeatability of events during execution of a scenario.

The training system 1 may be calibrated in order to experiment with a large number of particular cases, especially in the event of user error during a training session or even in order to test the user against complications. In addition, the training system 1 makes it possible to recreate the stress and the physical and mental pressure of a real situation, by heat, sounds, air regulation, rendering of the field of vision. With the training system 1, during a training session, the user can learn techniques and methods, and realize the errors made during the virtual immersions without these errors being fatal to the user (injury, accident, etc. . . . ) and thus making it possible to avoid them in real intervention. The scenarios implemented by the training system 1 can cover various situations such as accidents of all types, natural disasters, attacks, rescue operations, theaters of military operations and their specific missions. The scenarios make it possible to understand the identification of risks, CBRN recognition, CBRN analysis, interventions in a contaminated environment, the doctrines for implementing health countermeasures, the principles of supporting victims, damages control, the design and implementation of emergency plans. The education and training is aimed at crisis managers, agents of the ministries of the interior, of defense, of justice, executives of industrial premises in charge of security, trainers in health education, etc.

The hereinbefore drawings and their description illustrate rather than limit the invention. It should be noted that the embodiments of the present invention are suitable for use for training a user, it can also be used to train a group of users, each user having his own CBRN-AR mask. It is also possible that the system comprises several objects of the container-type or of the detector-type depending on the foreseen scenario.

The invention claimed is:

1. A training system for training in chemical, biological, radiological and nuclear (CBRN) risk using a virtual reality scenario, comprising:

a CBRN augmented virtual reality (CBRN-AR) mask including:

a virtual reality screen;

at least one graphics processing module comprising a graphics microprocessor for broadcasting images of the virtual reality scenario on the virtual reality screen;

at least one main processing module comprising a main microprocessor;

a memory storing the, at least one, virtual reality scenario;

at least one biometric sensor measuring a physiological parameter of a user of the CBRN-AR mask during the execution of said virtual reality scenario; and at least one stress actuator modifying at least one internal environmental parameter of the CBRN-AR mask during the execution of said virtual reality scenario, said stress actuator comprising a controlled opening valve which directs air towards the interior of the CBRN-AR mask so as to regulate an incoming air flow;

the main microprocessor of the main processing module is arranged for:

controlling the graphics microprocessor of the graphics processing module to broadcast said virtual reality scenario on the virtual reality screen;

comparing the physiological parameter of the user with a reference physiological value; and adapting said virtual reality scenario in real time by controlling the stress actuator in real time to modify at least one internal environmental parameter of the CBRN-AR mask, said modification of at least one internal environmental parameter of the CBRN-AR mask consisting at least in operating the controlled opening valve, to regulate the flow of incoming air flow so as to reduce the arrival of air flow to increase a state of stress of the user, or to increase the arrival of air flow to reduce said state of stress of the user.

2. The training system of claim 1, wherein the biometric sensor is selected from a pulse sensor, a body temperature sensor, a sensor for measuring blood oxygen saturation, electrodes for measuring the electrical activity of the brain, a sensor for measuring respiratory rate, a sensor for measuring the diameter of the pupil, and/or a sensor for measuring the electrodermal conductance.

3. The training system of claim 1, wherein the stress actuator further comprises a heating resistor and/or an electrode generating an electric discharge.

4. The training system of claim 1, wherein the CBRN-AR mask further comprises a filter cartridge, said filter cartridge being equipped with the controlled opening valve.

5. The training system of claim 1, wherein the CBRN-AR mask is coupled to an external respirator via the controlled opening valve.

6. The training system of claim 4, wherein the filter cartridge is equipped with an odor generator, for example one or more gas capsules or tablets releasing a specific odor.

7. The training system of claim 5, wherein the external respirator is equipped with an odor generator, for example one or more gas capsules or tablets releasing a specific odor.

8. The training system of claim 4, wherein the filter cartridge includes a battery.

9. The training system of claim 1, wherein the CBRN-AR mask comprise an electronic board integrating the graphics processing module, the main processing module and the memory, said electronic board being connected to at least one virtual reality camera, at least one audio module, and/or at least one wired or wireless connection integrated into said CBRN-AR mask.

10. The training system of claim 1, further comprising a control module interconnected with the CBRN-AR mask, the control module comprising a library comprising virtual reality scenarios, at least one virtual reality scenario being uploaded to the memory of the CBRN-AR mask before the execution of said virtual reality scenario.

11. The training system of claim 1, further comprising at least one container-type object and at least one detector-type object interconnected together as well as with the control module and the CBRN-AR mask.

12. The training system of claim 11, wherein each of the objects of container-type and detector-type includes a secondary microprocessor connected to a plurality of sensors and actuators, the secondary microprocessor being arranged to activate one or more functions of said sensors and actuators during the execution of said virtual reality scenario.

13. A non-transitory computer readable medium storing a computer program for training in chemical, biological, radiological and nuclear (CBRN) risk using a virtual reality scenario, the computer program comprising program code instructions for the execution of following steps when the program is executed by a microprocessor of a training system, comprising a CBRN augmented virtual reality (CBRN-AR) mask:

executing a virtual reality scenario by broadcasting images to a user wearing the CBRN-AR mask;

measuring in real time at least one physiological parameter of a user during the execution of said virtual reality scenario;

comparing the, at least one, physiological parameter of the user with a, at least one, reference physiological value (PPRef); and adapting said virtual reality scenario in real time by controlling a state of stress of the user in real time, by modifying at least one internal environmental parameter of the CBRN-AR mask during the execution of said virtual reality scenario, said modification of at least one internal environmental parameter of the CBRN-AR mask consisting at least in regulating the flow of incoming air flow inside the CBRN-AR mask, so as to reduce the arrival of air flow to increase the state of stress of the user or to increase the arrival of air flow to reduce said state of stress of the user.

14. The non-transitory computer readable medium storing the computer program for training in CBRN risk using a virtual reality scenario of claim 13, wherein said modification of at least one internal environmental parameter inside the CBRN-AR mask may also consist of heating the air inside the CBRN-AR mask and/or generating an electric discharge inside the CBRN-AR mask.

* * * * *